United States Patent
Home

(10) Patent No.: US 6,332,395 B1
(45) Date of Patent: Dec. 25, 2001

(54) STRUCTURE OF A BARBEQUE PUSH-CART

(75) Inventor: William Home, Tamshui (TW)

(73) Assignee: Grand Hall Enterprise Co., Ltd., Taipei (TW)

( * ) Notice: Subject to any disclaimer, the term of this patent is extended or adjusted under 35 U.S.C. 154(b) by 0 days.

(21) Appl. No.: 09/867,479

(22) Filed: May 31, 2001

(51) Int. Cl.[7] .............................. A47J 37/00; A47J 37/04; A47J 37/07
(52) U.S. Cl. ................................ 99/340; 99/449; 99/450; 99/482; 126/9 R; 126/25 R
(58) Field of Search ..................... 99/339, 340, 352–355, 99/400, 401, 444–450, 481, 482; 126/25 R, 9 R, 41 R; 426/465, 423, 281, 314, 315

(56) References Cited

U.S. PATENT DOCUMENTS

| | | | |
|---|---|---|---|
| 3,559,564 | * | 2/1971 | Turner et al. ............................ 99/332 |
| 3,709,142 | * | 1/1973 | Peterson .............................. 99/470 X |
| 3,713,846 | * | 1/1973 | Turner et al. ....................... 99/340 X |
| 3,718,485 | * | 2/1973 | Lankford ............................. 99/472 X |
| 3,769,902 | * | 11/1973 | Hurwitz .................................. 99/472 |
| 4,968,516 | * | 11/1990 | Thompson ........................ 426/523 X |
| 5,097,759 | * | 3/1992 | Vilgrain et al. ..................... 99/483 X |
| 5,123,337 | * | 6/1992 | Vilgrain et al. ..................... 99/340 X |
| 5,575,198 | * | 11/1996 | Lowery ................................ 99/446 X |
| 5,741,536 | * | 4/1998 | Mauer et al. ...................... 426/281 X |
| 5,767,487 | * | 6/1998 | Tippmann ........................... 99/472 X |

* cited by examiner

Primary Examiner—Timothy F. Simone
(74) Attorney, Agent, or Firm—Rosenberg, Klein & Lee

(57) ABSTRACT

A structure of BBQ pushcart having a cart body, a grilling oven mounted on the cart body is disclosed. The two lateral sides of the push-cart are respectively pivotally mounted with a plurality of support frames, the height of the frame is lower than the width of the cart body and the bottom edge of the cart body, at the corner of the frame is mounted with a mounting tube having a horizontal tube body and a through hole is mounted at the wall of the mounting tube and an elastic peg is inserted, an engaging hole, corresponding to the elastic peg, is provided at the support frame such that when the frame is vertically extended from the bottom board of the cart body, the elastic peg will automatically engage with the engaging hole to lock the frame, and the releasing of the elastic peg will fold the frame and assemble below the cart body.

2 Claims, 10 Drawing Sheets

STRUCTURE OF A BARBEQUE PUSH-CART

BACKGROUND OF THE INVENTION (a) Field of the Invention

The present invention relates to a barbeque (BBQ) pushcart, and in particular, a BBQ push cart having a plurality of retractable support frames mounted at the bottom of a cart body, allowing the frames to be kept under the cart body and/or extended when in use.

(b) Description of the Prior Art

Conventional BBQ stoves which fixed onto a fixed structure on the ground or support are normally too close to the ground, and very often, the prepared and barbecued food may not be hygienic enough as a result of pollution by the dust from the ground or the ashes from the burning charcoal. Besides, in a squatted position to grill food by a person is not comfortable. To overcome these drawbacks, high grilling net BBQ stove has been developed. However, this BBQ stove causes other problems, especially lacking a storing space to keep the BBQ stove when it is not in use. Other conventional BBQ stoves are designed but in operation, some tools are needed in order to put up the BBQ stove to work or to dissemble when it is not in use. In view of the above, it is a prime object to design an improved structure of a BBQ pushcart, which can mitigate the above drawbacks.

SUMMARY OF THE INVENTION

Accordingly, it is an object of the present invention to provide an improved structure of a BBQ push-cart, wherein a plurality of support frames are provided to the two lateral sides of the cart body and are pivotally mounted together with a mounting tube which can be folded and kept at the bottom of the cart body.

Yet another object of the present invention is to provide an improved structure of a BBQ push-cart, wherein the cart body is mounted with a grill oven having a grilling basin, and the sides of the basin are grooved, and a slit is formed to the groove to discharge residue in the course of barbequing.

A further object of the present invention is to provide an improved structure of a BBQ push-cart, wherein a stepped wall is formed at the two lateral wall of the basin for the horizontal mounting of a grilling net and a charcoal holding board at different height of the lateral wall, allowing independent discharging of ashes of the charcoal by first removing the grilling net and then slanting the charcoal holding board to discard the ashes.

A further object of the present invention is to provide an improved structure of a BBQ push-cat, wherein the collection of ashes and clearing of the cart body are simple, without turning the entire BBQ push-cart upside down as compared to the conventional BBQ stove.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PRESENT INVENTION

Figure 1:
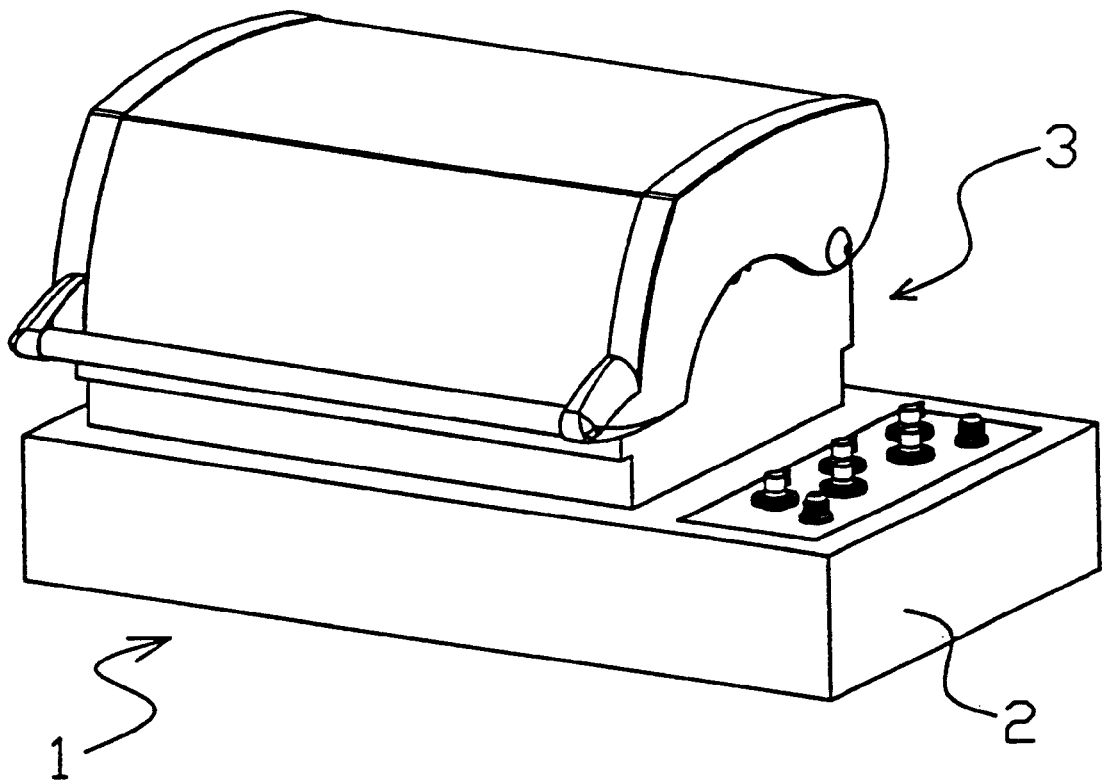
FIG. 1 is a perspective view of the BBQ pushcart of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, alterations and further modifications in the illustrated device, and further applications of the principles of the invention as illustrated herein being contemplated as would normally occur to one skilled in the art to which the invention relates.

Referring to FIG. 1, there is shown a BBQ push-cart 1 having a plurality of support frames being folded comprising a cart body 2 and a grill oven 3 mounted thereon. The four vertically support frames are folded and stored beneath the cart body 2 and are covered by the lateral wall of a hood (not shown) of the cart body 2.

Figure 2:
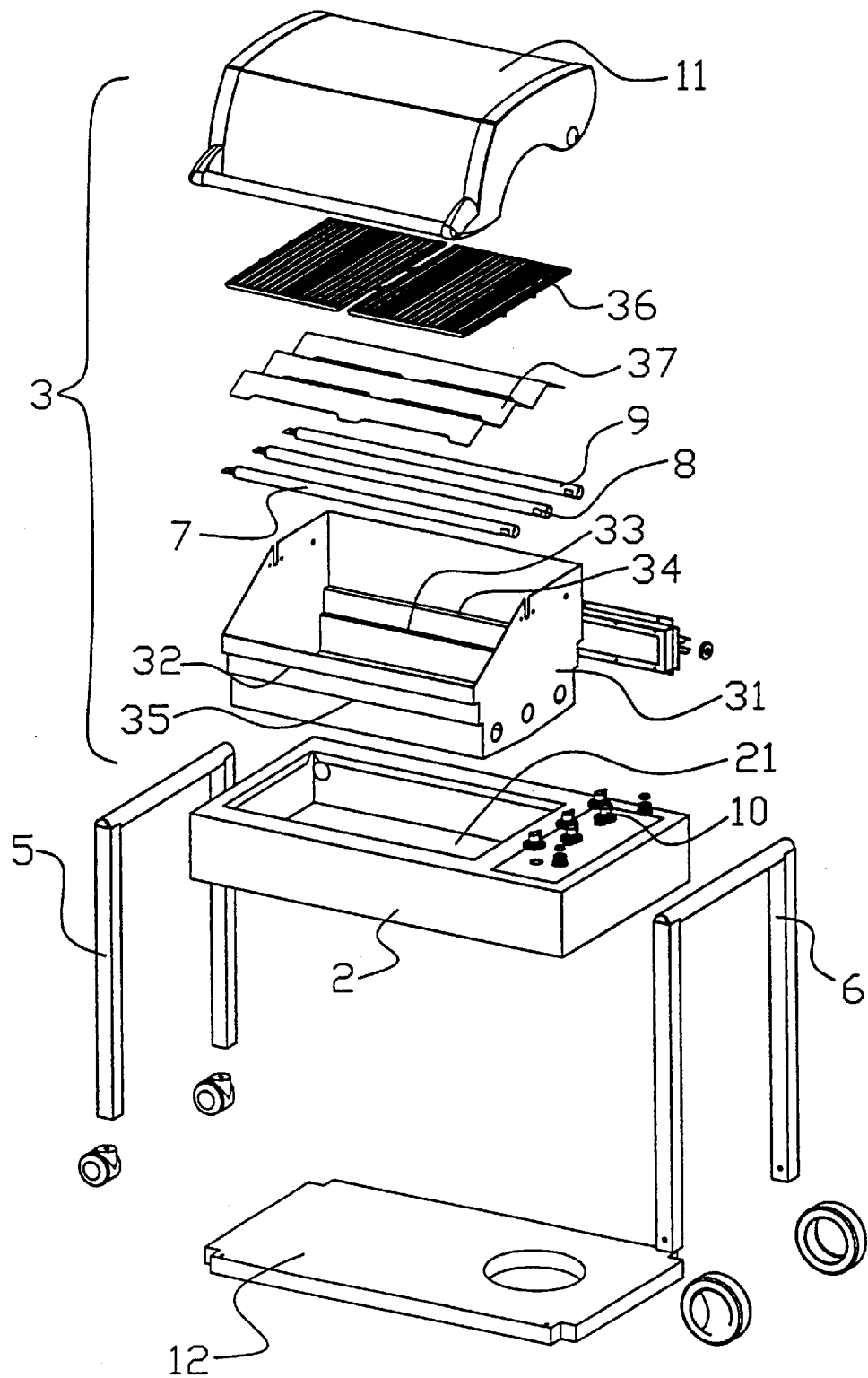
FIG. 2 is a perspective exploded view of the BBQ pushcart of the present invention.

FIG. 2 shows a perspective view of the BBQ pushcart of the present invention. The BBQ pushcart 1 has a cart body 2 and a grill oven 3. The two lateral sides of the pushcart 1 are respectively and pivotally mounted with arch-shaped support frames 5, 6 having an appropriate length from the ground. An enhanced horizontal board 12 is provided to the support frames 5, 6 and is perpendicular to the support frames 5, 6. The length of the support frames 5, 6 is shorter than the width of the lateral sides of the cart body 2, and the grilling oven 3 includes a grilling basin 31 being engaged onto a through hole 21 at the cart body 2 and the lateral wall of the basin 31 is formed into stepped walls 32, 33, 34, 35 which can support a grilling net 36 and a charcoal holding board 37, and there is a high different in height between the grilling net 36 and the charcoal holding board 37 close to the bottom face of the charcoal holding board 37, a plurality of gas burning pipes 7, 8, 9 are inserted through the lateral wall of the basin 31. An adjusting switch 10 is provided on the cart body 2 to regulate the gas burning pipes 7, 8, 9. The gas heats the charcoal on the board 37. At the edge of the upper end of the basin 31, a hood 11 is hinged thereto to keep away pollution and to keep the grilled food hygienically, and at the same time, the heat within the hood 11 can further heat the food.

Figure 3:
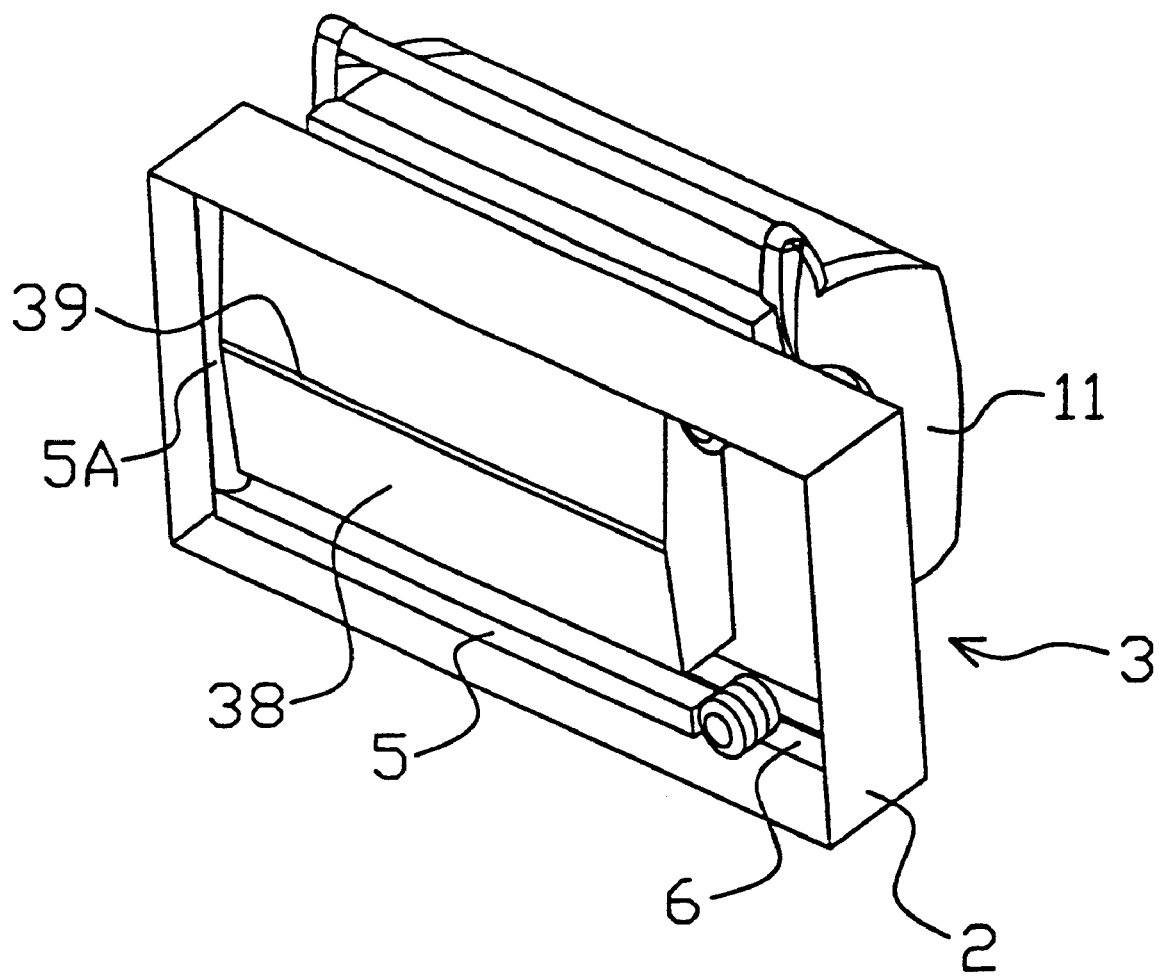
FIG. 3 is a perspective view from the bottom of the BBQ pushcart of the present invention.
Figure 4:
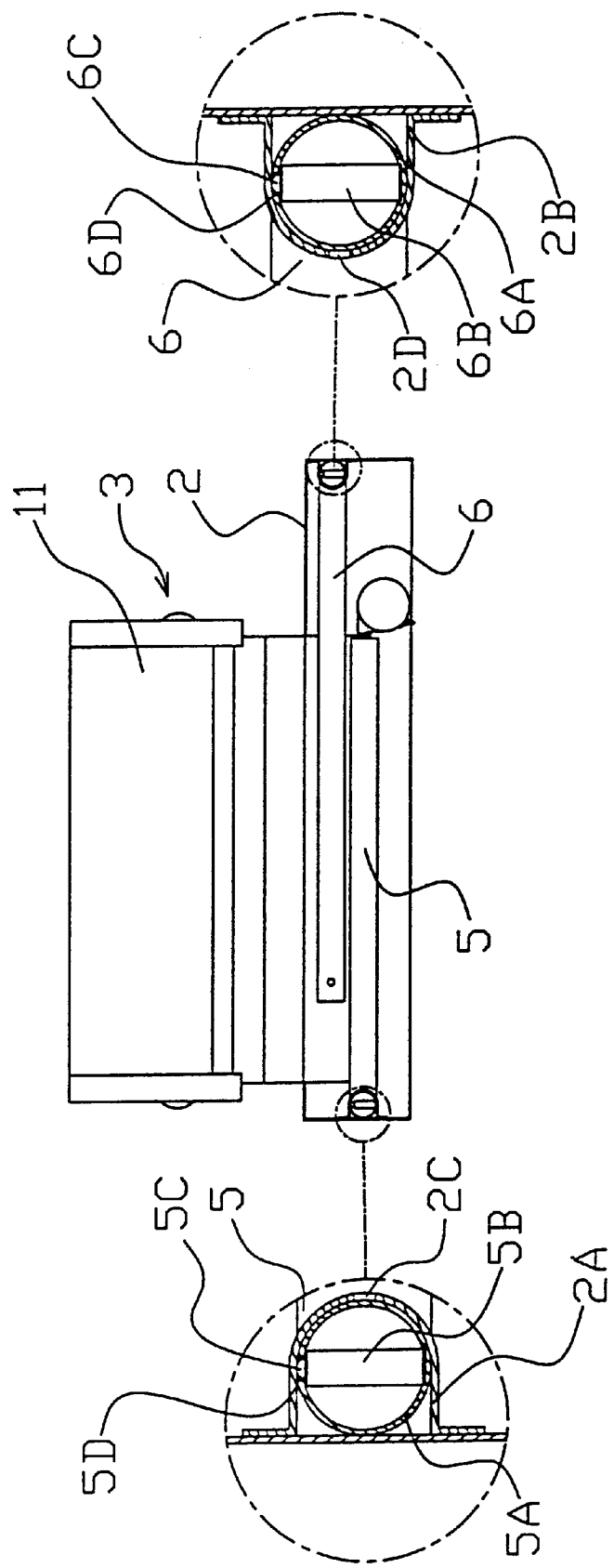
FIG. 4 is a sectional view along line III—III of FIG. 3 of the present invention.
Figure 5:
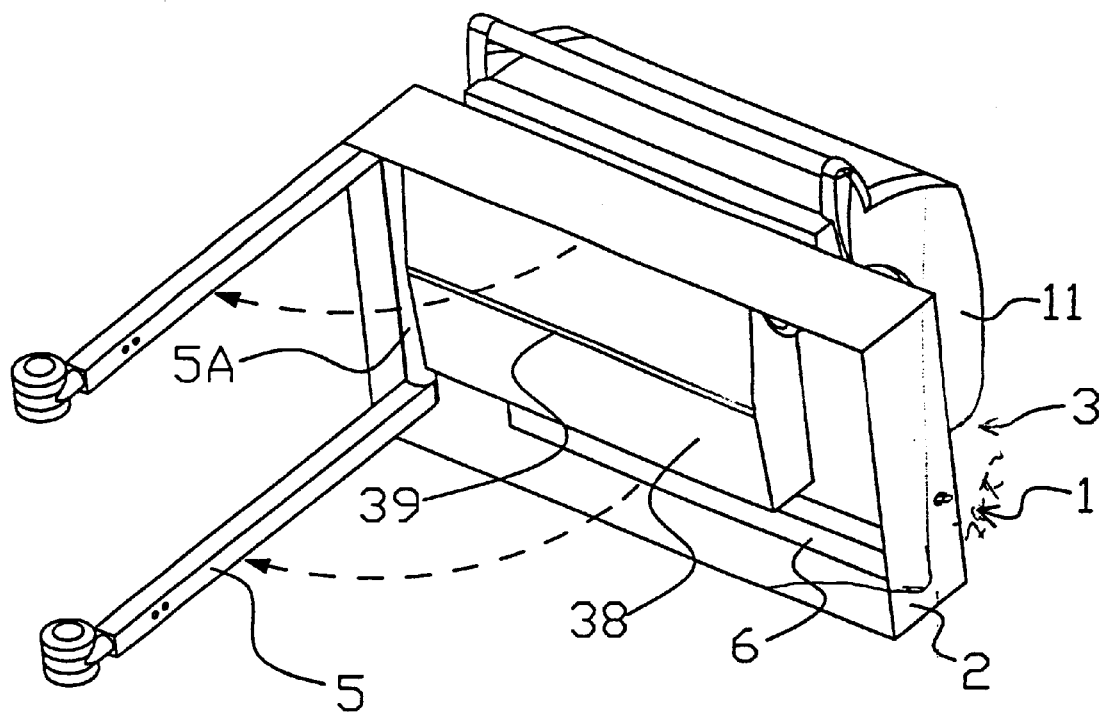
FIG. 5 is a perspective view showing the extension of the support frame at the bottom of the BBQ pushcart of the present invention.
Figure 6:
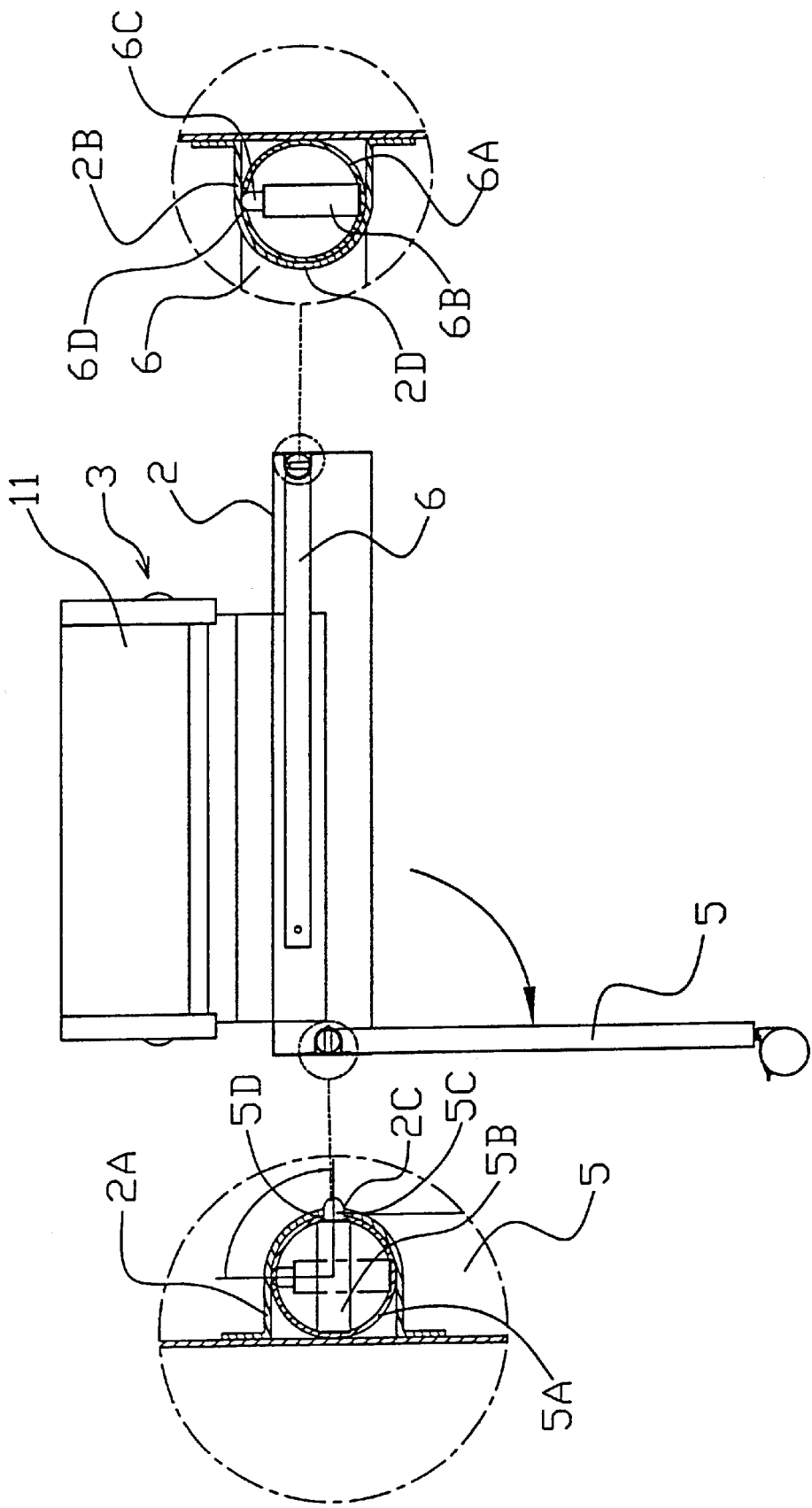
FIG. 6 is a sectional view along line VI—VI of FIG. 5 of the present invention.
Figure 7:
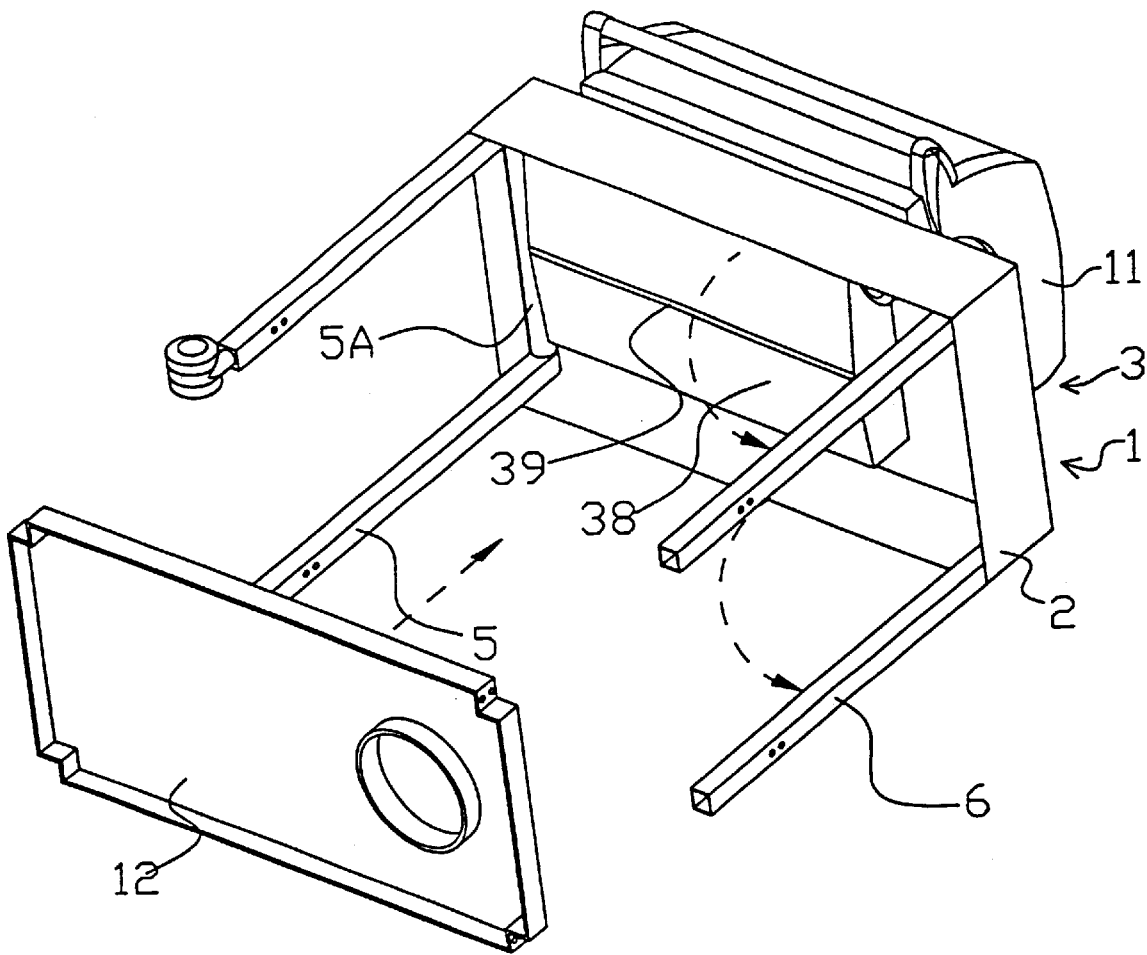
FIG. 7 is a perspective view showing dissemble of the support frame of the present invention.
Figure 8:
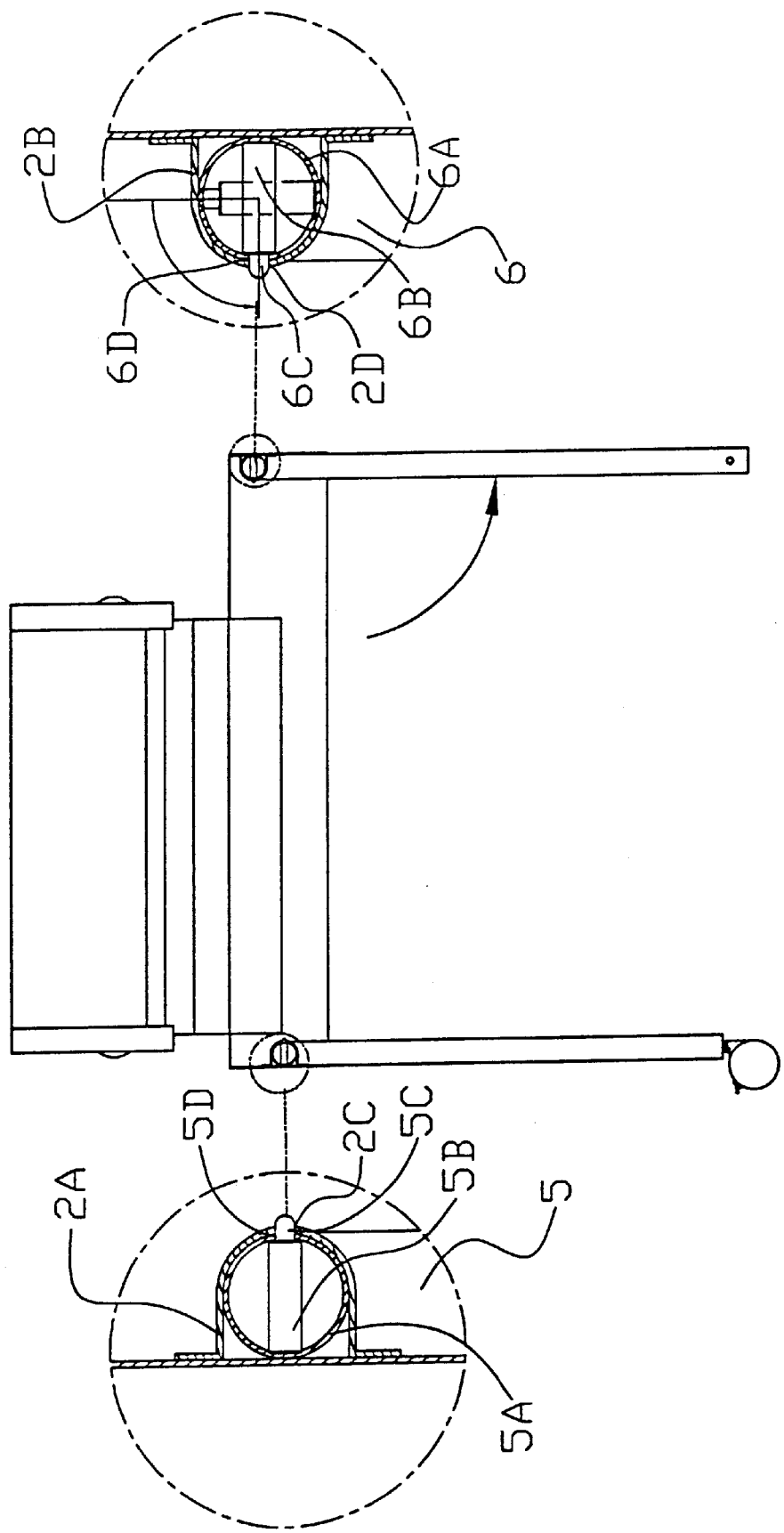
FIG. 8 is a sectional view along line VII—VII of FIG. 6.

As shown in FIG. 3, the support frames 5, 6 are pivotally mounted at the bottom of the cart body 2. The bottom 38 of the basin 31 is recessed and a slit 39 is provided to the cart body 2. As shown in FIG. 4, the pivotal regions of the frames 5, 6 to the cart body 2 are provided with horizontal tubes 5A, 6A which mounted into the mounting tubes 2A, 2B. After that, on the mounting tubes 2A, 2B, through holes 5D, 6D are provided to the tube wall for mounting with elastic pegs 5B, 6B. On the mounting tubes 2A, 2B corresponding to peg ends 5C, 6C of the elastic pegs 5B, 6B, engaging holes 2C, 2D are provided, such that the support frames 5, 6 can be extended out as shown in FIGS. 5 and 7. As shown in FIGS. 6, 7 and 8, when a support frame 5 or 6 is extended from the cart body 2 and is positioned vertically, the peg end 5C or 6C of the elastic peg 5B or 6B will pass through the through hole 5D or 6D, and is automatically mounted into the engaging hole 2C or 2D of the through hole 5D or 6D so as to lock the frames 5, 6.

Figure 9:
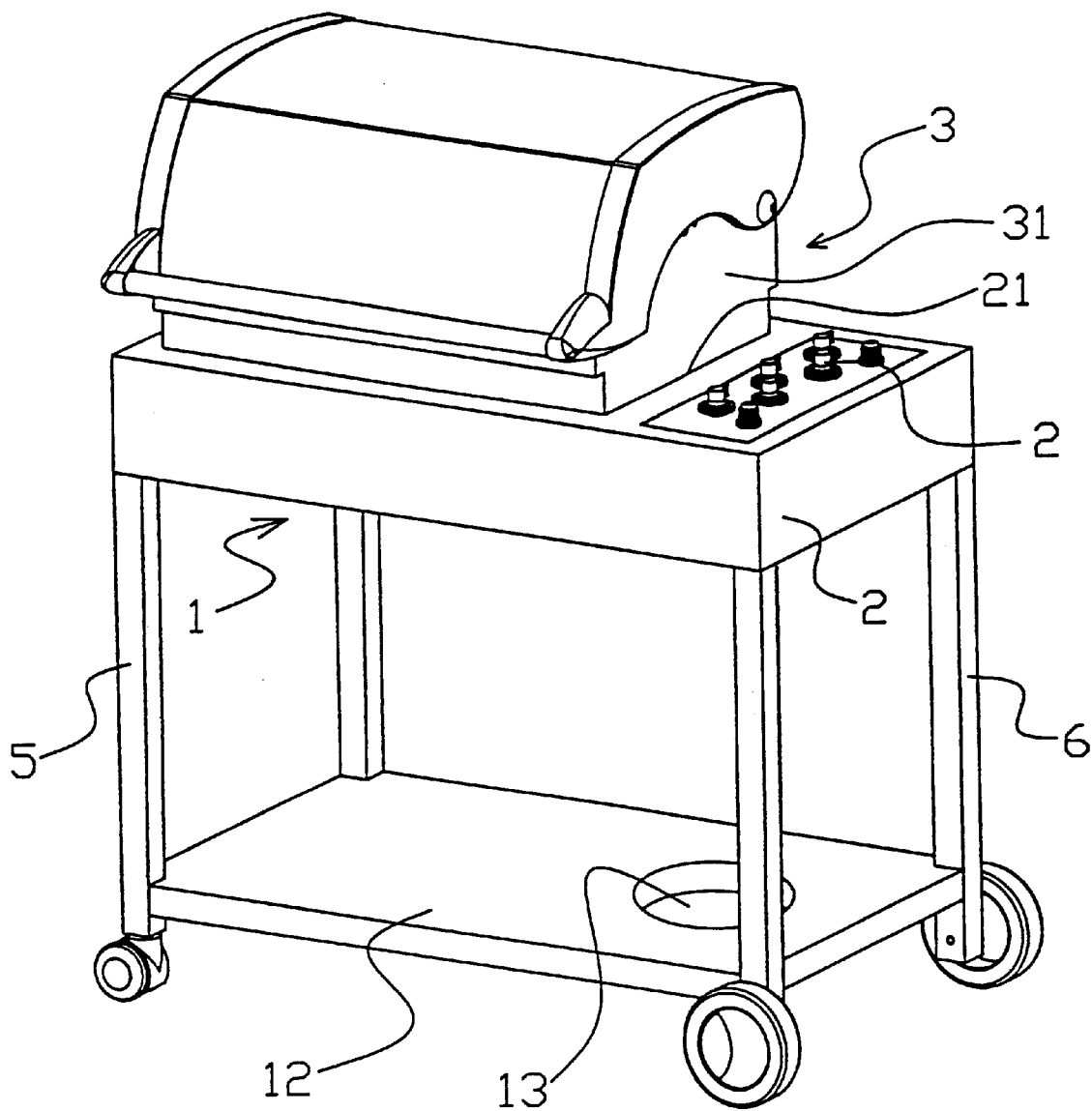
FIG. 9 is a perspective view of the BBQ pushcart in accordance with the present invention.
Figure 10:
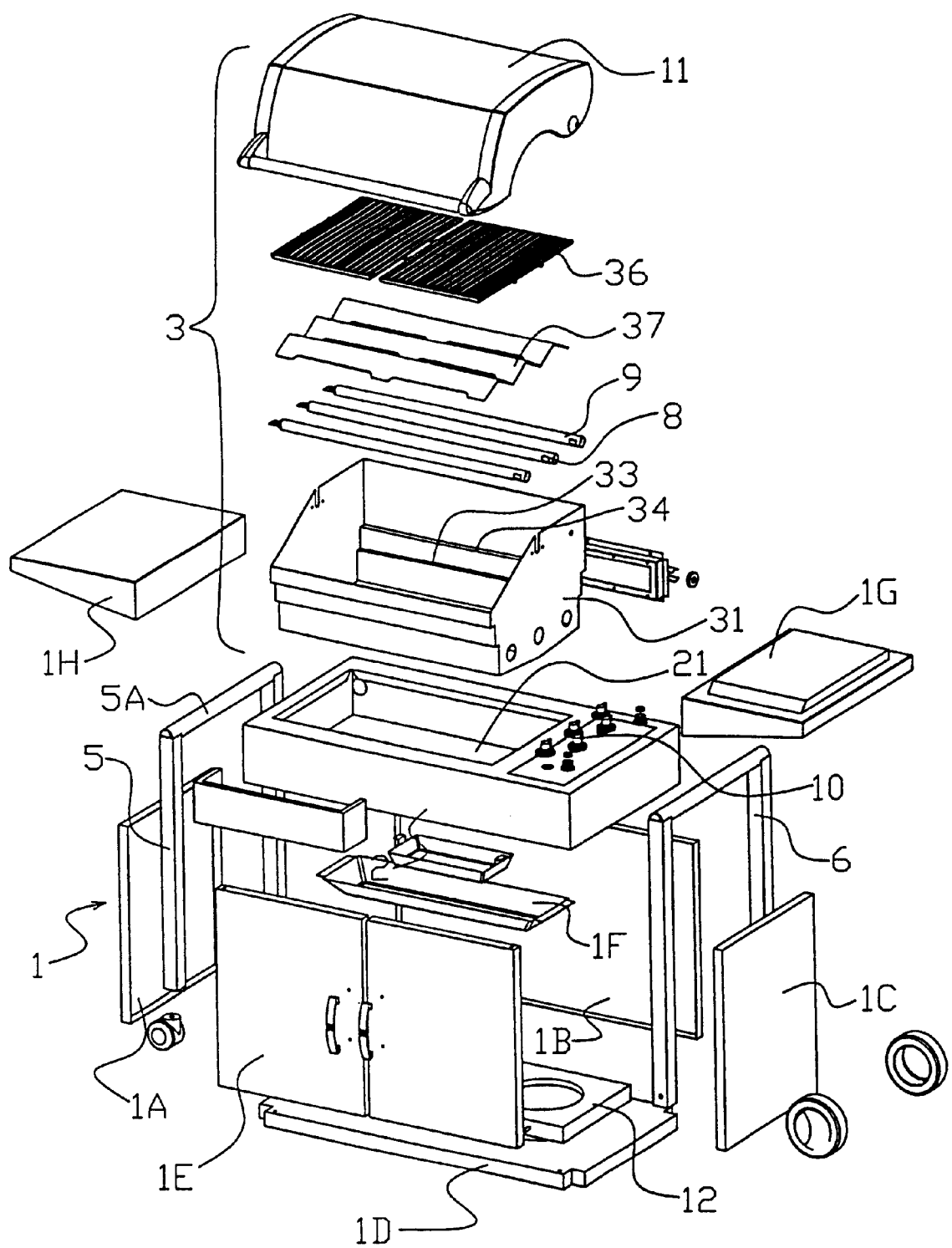
FIG. 10 is a perspective exploded view of the BBQ pushcart of another preferred embodiment in accordance with the present invention.

As shown in the figure, the enhanced board 12 is provided at an appropriate height vertically to the support frames 5, 6 from the ground. Referring to FIG. 9, the BBQ pushcart 1 having the basic structure is shown. The enhanced board 12 is provided with through hole 13 and a gas tank is positioned on the board 12. When the support frames 5, 6 are to be retracted; a tiny pin (not shown) is used to push out the peg end 5C or 6C of the elastic peg 5B or 6B from the engaging hole 2C, 2D. Then the support frame 5 or 6 is retracted and is stored. FIG. 10 shows another construction of the BBQ push-cart, wherein a plurality of boards 1A, 1B, 1C, 1D and 1E are mounted onto the frames 5, 6 to form a cabinet at the bottom of the cart body 2, and a rubbish collection container 1F can be provided within the cabinet, or a platforms 1G can be mounted to the cart body 2 to provide a wider flat space for handling food.

I claim:

1. A structure of BBQ push-cart having a cart body, a grilling oven mounted on the cart body, characterized in that the two lateral sides of the push-cart are respectively pivotally mounted with a plurality of support frames, the height of the frame is lower than the width of the cart body and the bottom edge of the cart body, at the corner of the frame is mounted with a mounting tube having a horizontal tube body and a through hole is mounted at the wall of the mounting tube and an elastic peg is inserted, an engaging hole, corresponding to the elastic peg, is provided at the support frame such that when the frame is vertically extended from the bottom board of the cart body, the elastic peg will automatically engage with the engaging hole to lock the frame, and the releasing of the elastic peg will fold the frame and assemble below the cart body.

2. A structure of BBQ push cart of claim 1, wherein the grilling oven is formed integrally as a grilling basin having a recess at the two sides of the bottom of the basin, the center of the recess is a residue-discharge slit, and at an appropriate height of the basin, a stepped wall is formed such that the flat surface of the folding wall holds the edge of a grilling net and a charcoal holding board.

* * * * *